(12) United States Patent
Chen et al.

(10) Patent No.: US 7,466,755 B2
(45) Date of Patent: Dec. 16, 2008

(54) METHOD FOR VIDEO ERROR CONCEALMENT BY UPDATING STATISTICS

(75) Inventors: Tsuhan Chen, Wexford, PA (US); Trista Pei-Chun Chen, Pittsburgh, PA (US); Yuh-Feng Hsu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 820 days.

(21) Appl. No.: 10/410,274

(22) Filed: Apr. 10, 2003

(65) Prior Publication Data
US 2004/0066853 A1     Apr. 8, 2004

Related U.S. Application Data (60) Provisional application No. 60/415,783, filed on Oct. 4, 2002.

(51) Int. Cl.
*H04N 7/12*  (2006.01)
*H04N 11/02*  (2006.01)

(52) U.S. Cl. .............................. 375/240.27; 375/240.26

(58) Field of Classification Search ............. 375/240.27
See application file for complete search history.

(56) References Cited

U.S. PATENT DOCUMENTS

| | | | | |
|---|---|---|---|---|
| 5,844,573 | A * | 12/1998 | Poggio et al. ................ | 345/441 |
| 6,675,145 | B1 * | 1/2004 | Yehia et al. .................. | 704/270 |
| 6,990,151 | B2 * | 1/2006 | Kim et al. ............... | 375/240.27 |
| 7,027,054 | B1 * | 4/2006 | Cheiky et al. ................ | 345/473 |
| 7,068,718 | B2 * | 6/2006 | Kim et al. ............... | 375/240.02 |
| 7,075,661 | B2 * | 7/2006 | Petty et al. ................... | 356/603 |
| 7,085,401 | B2 * | 8/2006 | Averbuch et al. ............ | 382/103 |
| 7,257,239 | B2 * | 8/2007 | Rowe et al. .................. | 382/118 |

OTHER PUBLICATIONS

ITU-T Recommendation H.263, ("Transmission of Non-Telephone Signals, Video Coding For Low Bit Rate Communication"), Jan. 27, 1998.
Motion Pictures Experts Group, "Overview of the MPEG-4 Standard," ISO/IEC JTC1/SC29/WG11 N4668, Mar. 2002.
Trista Pei-chun Chen and Tsuhan Chen, "Adaptive Joint Source-Channel Coding using Rate Shaping," to appear in ICASSP 2002.
Trista Pei-chun Chen and Tsuhan Chen, "Updating Mixture of Principal Components for Error Concealment," IEEE ICIP, 2002.
H. Schulzrinne, S. Casner, R. Frederick, and V. Jacobson: "RTP: A Transport Protocol for Real-Time Applications," RFC1889, Jan. 1996.

(Continued)

*Primary Examiner*—David Czekaj
(74) *Attorney, Agent, or Firm*—Finnegan, Henderson, Farabow, Garrett & Dunner LLP (57) ABSTRACT

A method of error concealment that includes providing a first set of image data at a first time instant, providing a second set of image data at a second time instant, representing the first set of image data by a model of updating mixture of principal components (UMPC) to form a UMPC model having a plurality of components, receiving the second set of image data, wherein the second set of image data contains error-free data, and updating the UMPC model using the error-free data at the second time instant.

12 Claims, 5 Drawing Sheets

OTHER PUBLICATIONS

J. Postel, "User Datagram Protocol," RFC 768, Aug. 1980.

Trista Pei-chun Chen and Tsuhan Chen, "Markov Modulated Punctured Autoregressive Processes for Traffic and Channel Modeling," Packet Video, 2002.

D. M. Lucantoni, M. F. Neuts, and A. R. Reibman, "Methods for Performance Evaluation of VBR Video Traffic Models," IEEE/ACM Transactions on Networking, 2(2), 176-180, Apr. 1994.

P. R. Jelenkovic, A. A. Lazar, and N. Semret, "The Effect of Multiple Time Scales and Subexponentiality in MPEG Video Streams on Queuing Behavior," IEEE Journal on Selected Areas in Communications, 15(6), 1052-1071, Aug. 1997.

M. M. Krunz, A. M. Makowski, "Modeling Video Traffic using $M/G/\infty$ Input Processes: A Compromise Between Markovian and LRD Models," IEEE Journals on Selected Areas in Communications, 16(5), 733-748, 1998.

Deepak S. Turaga and Tsuhan Chen, "Hierarchical Modeling of Variable Bit Rate Video Sources," Packet Video, 2001.

G.D. Forney, Jr., "The Viterbi: Algorithm," Proc. of the IEEE, vol. 61, No. 3, 268-278, Mar. 1973.

A. Ortega and K. Ramchandran, "Rate-Distortion Methods for Image and Video Compression," IEEE Signal Processing Magazine, 15(6), 23-50, Nov. 1998.

H. Everett, "Generalized Lagrange Multiplier Method for Solving Problems of Optimum Allocation of Resources," Operations Research, 399-417, 1963.

Y. Shoham and A. Gersho, "Efficient Bit Allocation for an Arbitrary Set of Quantizers," IEEE Trans. ASSP, 1445-1453, Sep. 1988.

J. Vass and X. Zhuang, "Adaptive and Integrated Video Communication System Utilizing Novel Compression, Error Control, and Packetization Strategies for Mobile Wireless Environments," Packet Video, 2000.

H. Sun and W. Kwok, "Concealment of Damaged Block Transform Coded Images using Projections Onto Convex Sets," IEEE Trans. Image Processing, vol. 4, 470-477, Apr. 1995.

D.S. Turaga, Ph.D. Thesis, Carnegie Mellon University, Jul. 2001.

X. Liu and T. Chen, "Shot Boundary Detection Using Temporal Statistics Modeling," ICASSP, 2002.

F.J. Huang and T. Chen, "Tracking of Multiple Faces for Human-Computer Interfaces and Virtual Environments", ICME, 2000.

M. Yajnik, S. Moon, J. Kurose, D. Towsley, "Measurement and Modeling of the Temporal Dependence in Packet Loss", IEEE INFOCOM, 345-52, Mar. 1999.

\* cited by examiner

METHOD FOR VIDEO ERROR CONCEALMENT BY UPDATING STATISTICS

RELATED APPLICATION

This application claims priority to U.S. Provisional Application Ser. No. 60/415,783, filed Oct. 4, 2002, which is expressly incorporated herein by reference.

DESCRIPTION OF THE INVENTION

1. Field of the Invention

This invention relates to digital video signal processing and, more particularly, to a method of concealing video signal errors.

2. Background of the Invention

There has been an increased interest in using digital technology to process television signals, such as recording television signals digitally, storing the digital signals, and reproducing the original television signals. A conventional digital video signal processing technology for recording analog television signals starts by sampling an incoming television analog signal. The sampled signals are then coded into digital form, and then stored, or recorded, onto a recording medium, such as a videotape. The recorded digital data may be reproduced through a playback mechanism, such as a videotape player. The reproduced digital data are decoded to form an analog signal that, ideally, reproduces the original television signal. However, errors may occur during digital signal processing due to external factors such as noise and drop-out attributable to the videotape recorder. As a result, there is some data loss and digital signals may become corrupted, resulting in degraded reproduction of the original analog television signals.

There are two known approaches to correct or minimize errors in video signal processing. A first approach is known as "correction" that incorporates additional data signals for the purpose of error detection and correction. These additional data signals are redundant signals and otherwise serve no other purpose. While the correction approach provides satisfactory results, this approach generally cannot serve as the sole means of dealing with error correction. A comprehensive correction scheme would require an excessive amount of the redundant data that may overload the existing data handling paths of the video signal processing hardware, raise the data rate to an unacceptable or impractical high level, and otherwise lengthen the time required for video signal processing. Besides, it is not necessary to correct every video error as the human eye does not perceive all signal degradations.

A second approach conceals, rather than corrects, video errors. A known error concealment scheme is projection onto convex sets (POCS). Error concealment based on POCS formulates each constraint about an unknown as a convex set. The optimal solution is obtained through iteratively projecting a previous solution onto each convex set. Data with some losses are projected onto a model built on error-free data, and the reconstructed data take the place of the previous projection in the corresponding region to more accurately reproduce the received signal. The success of a POCS algorithm relies on the model onto which the data are projected.

In formulating the model, there are a number of ways to represent an N-dimensional data, one of which being principal components, or N principal eigen-vectors of the data. Through the N eigen-vectors, the representation of data by principal components is continuous and linear. However, application of the principal components may be limited in video processing applications because non-linearity is generally present in video images. This is known as multi-modal characteristics. For example, facial images in a video sequence may have different dimensions in various poses and expressions.

A known method of formulating the model that deals with non-linearity of video signal processing is multi-modal probability distribution, or a mixture of principal components (MPC). To represent the N-dimensional data with MPC, available data space is divided into multiple sub-spaces, each of which is also referred to as a component. However, not all of the N eigen-vectors may be used for data representation within each sub-space.

In additional to taking into consideration non-linearity, video signal processing must also take into consideration changing of video components over time, or non-stationary characteristics. For time-variant data, the principal component representation thereof must also change with time. A method of "updating principal components" (UPC) has been proposed to update the principal components adaptively.

Figure 1:
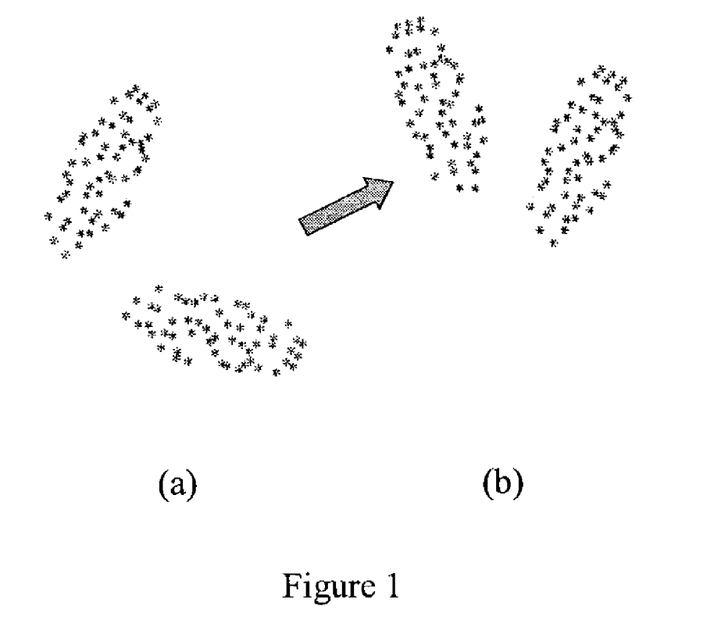
FIGS. 1(a) and 1(b) illustrate both the multi-modal and the non-stationary characteristics of data represented by mixture of principal components.

FIGS. 1(a) and 1(b) illustrate both the multi-modal and the non-stationary characteristics of data represented by mixture of principal components. Referring to FIGS. 1(a) and 1(b), a set of data are clustered to two components in a multi-dimensional space. The data is non-stationary, i.e., the stochastic properties of the data are time-varying. At time n, the data are clustered as shown in FIG. 1(a), and at time n', the data are clustered as shown in FIG. 1(b). Therefore, the mean of each component is shifting and the most representative axes of each component are also rotating.

SUMMARY OF THE INVENTION

In accordance with the present invention, there is provided a method of error concealment that includes providing a first set of image data at a first time instant, providing a second set of image data at a second time instant, representing the first set of image data by a model of updating mixture of principal components (UMPC) to form a UMPC model having a plurality of components, receiving the second set of image data, wherein the second set of image data contains error-free data, and updating the UMPC model using the error-free data at the second time instant.

In one aspect, the second time instant is before the first time instant in time.

In another aspect, the method further comprises receiving a third set of image data at a third time instant, wherein the third set of image data contains corrupted information, and reconstructing the corrupted information at the third time instant using the updated UMPC model.

Also in accordance with the present invention, there is provided a method of error concealment that includes representing a set of image data by a model of updating mixture of principal components (UMPC), each principal component of the UMPC model having a mean, a set of eigenvectors, and a weight at any given time instant, providing the set of image data at a first time instant and at any time instant before the first time instant, receiving the set of image data at a second time instant, wherein the set of image data at the second time instant contains at least one error-free region of interest (ROI), updating the UMPC model to minimize a representation error of the at least one error-free ROI at the second time instant by the UMPC model, receiving the set of image data at a third time instant, wherein the set of image data at the third time instant contains at least one corrupted ROI, and reconstructing the at least one corrupted ROI at the third time instant using the updated UMPC model at the second time instant.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

In the drawings.

DESCRIPTION OF THE EMBODIMENTS

The method of the present invention provides "updating mixture of principal components" (UMPC) to model multi-modal and non-stationary characteristics of video data. Specifically, the UMPC model of the present invention represents N-dimensional data with a time-variant mixture of principal components, i.e., each component changes with time. Therefore, the error concealment scheme consistent with the present invention updates the UMPC model when error-free data are received and reconstructs corrupted data with the updated UMPC model.

Figure 2:
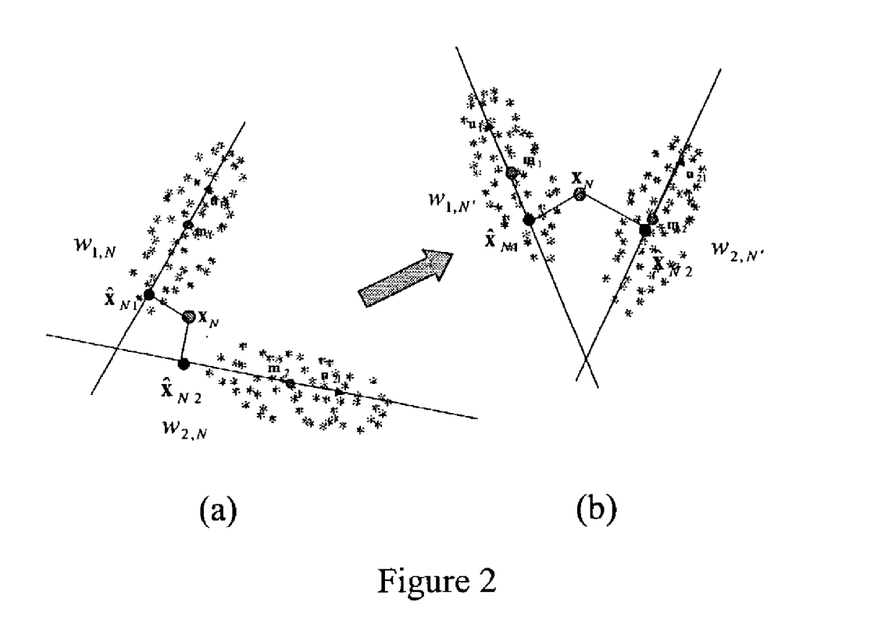
FIGS. 2(a) and 2(b) illustrate the representation of data with a method of the present invention.

FIGS. 2(a) and 2(b) illustrate the UMPC model representation of the data shown in FIGS. 1(a) and 1(b). At any instant, the data may be represented by a model that incorporates a weighted sum of the mean and principal axes of each component. Such a model changes its mean and principal axes of each component with time as shown in FIGS. 2(a) and 2(b). To model the current data efficiently, the representation or reconstruction error of the model evaluated at time n should have less contribution from data further back in time from the current time n. One way to optimize the model for minimizing such an error is shown by the following equation:

$$\min_{\substack{m_j^{(n)}, U_j^{(n)}, w_i \\ \forall i,j}} \left( \frac{1}{\sum_{i=0}^{\infty} \alpha^i} \right) \tag{1}$$

$$\sum_{i=0}^{\infty} \alpha^i \left\| x_{n-i} - \sum_{j=1}^{M} w_{n-i,j} \underbrace{\left[ m_j^{(n)} + \sum_{k=1}^{P} [(x_{n-i} - m_j^{(n)})^T u_{jk}^{(n)}] u_{jk}^{(n)} \right]}_{\hat{x}_{n-i,j}} \right\|^2$$

wherein n is time;

M is the number of mixture components in the representation;

$x_i$ is the data vector at time i;

$m_j^n$ is the mean of the $j^{th}$ mixture component estimated at time n;

$u_{jk}^{(n)}$ is the $k^{th}$ eigen-vector of the $j^{th}$ mixture component estimated at time n;

$U_j^{(n)}$ is the matrix with P columns of $u_{jk}^{(n)}$, wherein k=1~P;

$\hat{x}_{ij}$ is the reconstruction of $x_i$ with mixture component j;

$\hat{X}_i$ is the matrix with M columns of $\hat{x}_{ij}$, j=1~M;

$w_{ij}$ is the weight of $\hat{x}_{ij}$ to reconstruct $x_i$;

$w_i$ is the vector with M entries of $w_{ij}$;

α is the decay factor, wherein 0<α<1; and q, r are the indices of the mixture component.

The reconstruction errors contributed by previous data are weighted by powers of the decay factor α, i.e., the further back in time the data, the less they contribute to the modeling calculations.

Updating the UMPC model at time n therefore requires finding a solution to equation (1) above, which may be obtained by iteratively determining the means, sets of eigenvectors, and weights. In one iteration, the means are optimized using previous sets of eigenvectors and weights, the sets of eigenvectors and weights are then accordingly optimized with the means fixed. The next iteration starts again with updating the means first. The iterations are repeated until all the parameters converge or a predefined condition such as the number of iterations is achieved.

The initial condition of each parameter at any time n is calculated with the weighted combination of optimized parameters at a previous time n−1 and the new data $x_n$. For example, the initial value of the mean $m_q^{(n)}$ of mixture component q at time n may be determined by the following equation:

$$m_q^{(n)} = \left(1 - \frac{w_{nq}^2}{\sum_{i=0}^{\infty} \alpha^i w_{n-i,q}^2}\right) m_q^{(n-1)} + \left(1 - \frac{w_{nq}}{\sum_{i=0}^{\infty} \alpha^i w_{n-i,q}^2}\right)\left(x_n - \sum_{j=1, j \neq q}^{M} w_{nj} \hat{x}_{nj}\right) \tag{2}$$

As shown in equation (2), $m_q^{(n)}$ is obtained from a previous estimator $m_q^{(n-1)}$ and the current data $x_n$.

In addition, the initial value of a covariance matrix $C_r^{(n)}$ of mixture component r at time n may be determined by the following equation:

$$C_r^{(n)} = \alpha C_r^{(n-1)} + \quad (3)$$

$$(1-\alpha)\left\{\begin{array}{l}\left[(x_n - w_{nr}m_r^{(n)}) - \sum_{j=1,j\neq r}^{M} w_{nj}\hat{x}_{nj}\right][w_{nr}(x_n - m_r^{(n)})]^T + \\ [w_{nr}(x_n - m_r^{(n)})]\left[(x_n - w_{nr}m_r^{(n)}) - \sum_{j=1,j\neq r}^{M} w_{nj}\hat{x}_{nj}\right]^T - \\ w_{nr}^2(x_n - m_r^{(n)})(x_n - m_r^{(n)})^T\end{array}\right\}$$

As shown in equation (3), $C_r^{(n)}$ is obtained from previous estimator $C_r^{(n-1)}$ and the current data $x_n$.

Finally, the initial values of the weights may be determined by the following equation:

$$\begin{bmatrix} w_{n-i} \\ \lambda \end{bmatrix} = \begin{bmatrix} 2\hat{X}_{n-i}^T \hat{X}_{n-i} & 1 \\ 1^T & 0 \end{bmatrix}^{-1} \begin{bmatrix} 2\hat{X}_{n-i}^T x_{n-i} \\ 1 \end{bmatrix} \quad (4)$$

wherein $1=[1 \ldots 1]^T$ is an M×1 vector.

From the definition of the aforementioned parameters and equations (2)-(4), it is easily understood that when $\alpha \rightarrow 1$, i.e., data do not decay with time, the UMPC method of the present invention functions as the MPC method, and when M=1, the UMPC method of the present invention functions as the UPC method.

In addition to the general error concealment method of the present invention described above, a single sub-region of an image may also be processed. This is commonly referred to as region-of-interest (ROI) processing. With object-based video coding standards such as MPEG-4, the region of interest (ROI) information is available. A model-based error concealment approach can use such ROI information and build an improved error concealment scheme.

When a video decoder receives a video frame with at least one error-free ROI, the data in the ROI may be used to update the existing UMPC with the processes described above. In one aspect, all available error-free ROI are used to update the UMPC. In another aspect, the UMPC model is updated not in every time instant. Instead, it is updated intermittently to reduce computational complexity. In addition, the UMPC model of the present invention is updated with the incoming error-free ROI information when the error to represent the ROI with the current UMPC model is larger than a threshold. When a video decoder receives a frame of video with corrupted information in the ROI, the updated UMPC model may be used to reconstruct the corrupted ROI.

Figure 3:
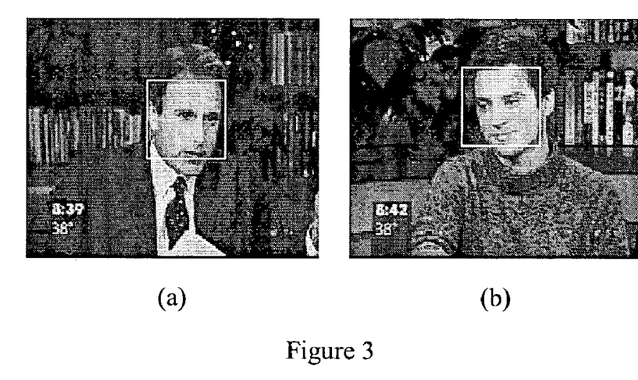
FIGS. 3(a) and 3(b) show two video frames with region of interest specified.

FIGS. 3(a) and 3(b) show two video frames with ROI specified. The performance of the UMPC model of the present invention is evaluated with a test video sequence recorded from a TV program shown in FIGS. 3(a) and 3(b). The evaluated UMPC model includes three mixture components, each having two eigenvectors. However, the number of mixture components may be determined based on empirical results. For example, if a facial region is the ROI, three mixture components may proximate the left, center, and right of a human face. The optimal choice of the number of mixture components can be found by examining the representation performance of the UMPC model versus the number of mixture components.

The video codec used in the evaluation is the ITU-T H. 263 standard on a computer with an Intel Pentium III 650 microprocessor, and the time consumed to update the UMPC model was about 10 seconds per ROI. The time consumed to reconstruct corrupted ROI with the UMPC model is almost negligible, at 20 ms per ROI.

Figure 4:
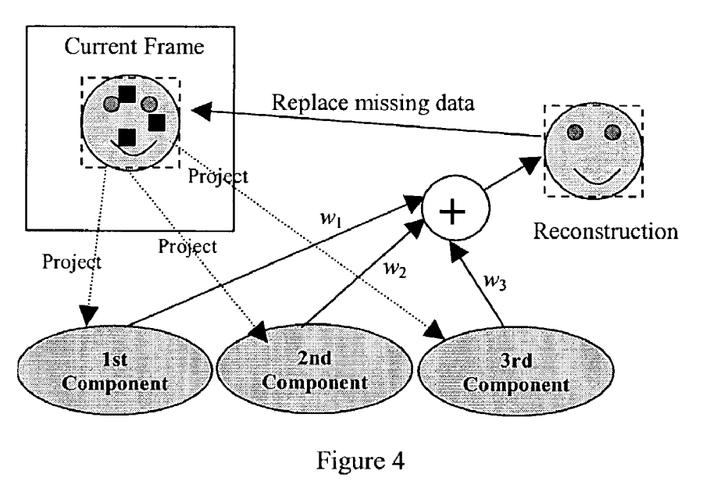
FIG. 4 is a block diagram illustration one embodiment of the present invention.

FIG. 4 illustrates the UMPC model for error concealment for the aforementioned illustration. Referring to FIG. 4, the three mixture components are identified as $1^{st}$ component, $2^{nd}$ component, and $3^{rd}$ component. A corrupted ROI is first reconstructed using each individual mixture component. The resulting reconstructed ROI is formed by combining the three individually reconstructed ROI. The weights for the combination are inversely proportional to the reconstruction error of each individually reconstructed ROI. In one aspect, the combination is a linear combination. After the reconstruction of ROI with UMPC is complete, the corrupted macroblock (MB), a block unit of pixels, is replaced with the corresponding data in the reconstructed ROI just obtained. The process of reconstruction with the UMPC model and replacement of corrupted MB is repeated iteratively until a satisfactory final reconstruction is obtained.

Figure 5:
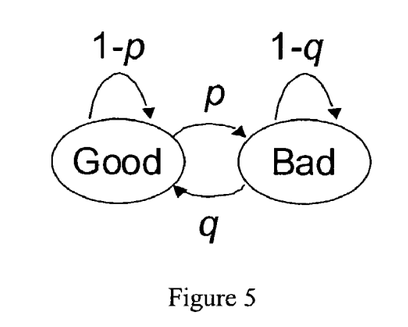
FIG. 5 shows the simulation of bursty error to corrupt the macroblocks of region of interest with a two-state Markov chain.

As shown in FIG. 5, a two-state Markov chain is used to simulate the bursty error to corrupt the MB. A Markov chain is known to one skilled in the art and will not be described herein. In FIG. 5, "good" and "bad" correspond to error-free and erroneous states, respectively. The transition rate from "good" to "bad" is p and the transition rate from "bad" to "good" is q. Therefore, the overall error rate $\epsilon$ can be determined as $\epsilon = p/(p+q)$. In the evaluations performed, $\epsilon = 0.05$ and $p = 0.01$.

Specifically, two sets of experiments performed: intra-coding and inter-coding. In the intra-coding scenario, the results with no error concealment, error concealment with the MPC method, and error concealment with the UMPC model were compared. In the evaluation of no error concealment, when the MB is corrupt, the contents were lost. For error concealment with the MPC method, the number of mixture components M is three and the number of eigenvectors P for each mixture components is two. For error concealment with the UMPC method of the present invention, the number of mixture components M is also three and the number of eigenvectors P for each mixture components is also two. The decay factor $\alpha$ is 0.9.

For the inter-coding scenario, three cases were compared to one another: (1) MC: error concealment using motion compensation, wherein each MB is predicted from the previous or future frame of the image; (2) MPC: error concealment with MPC as the model for motion compensated data; and (3) UMPC: error concealment with UMPC as the model for motion compensated data.

At each time instant, the model used is updated with five iterations. A smaller number of iteration may be used to decrease delay. In the error concealment stage when an erroneous MB is received, five iterations of POCS, with either MPC or UMPC model, were performed.

Figure 6:
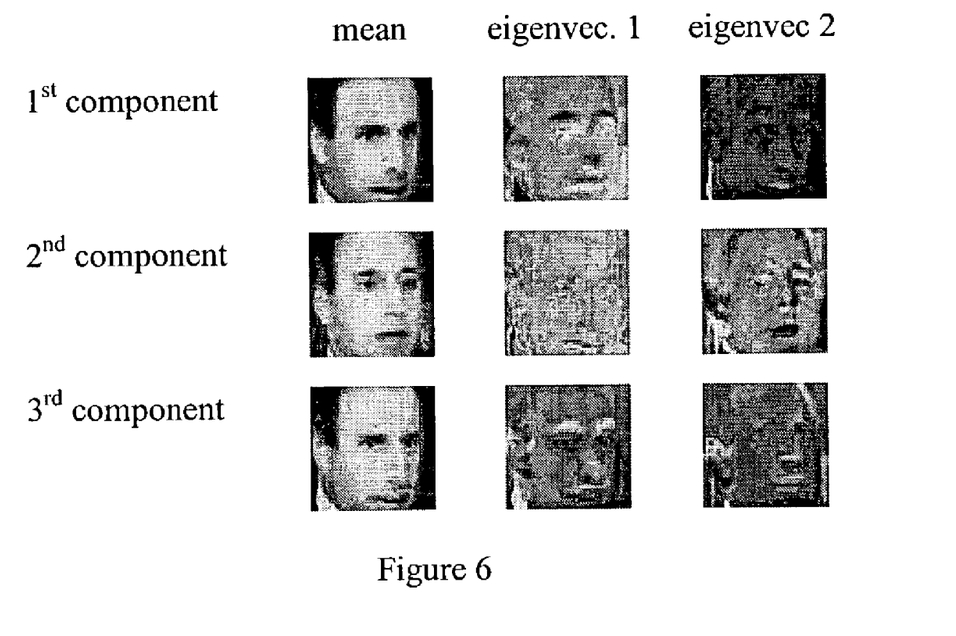
FIG. 6 shows the means and eigenvectors of UMPC at one time instance.
Figure 7:
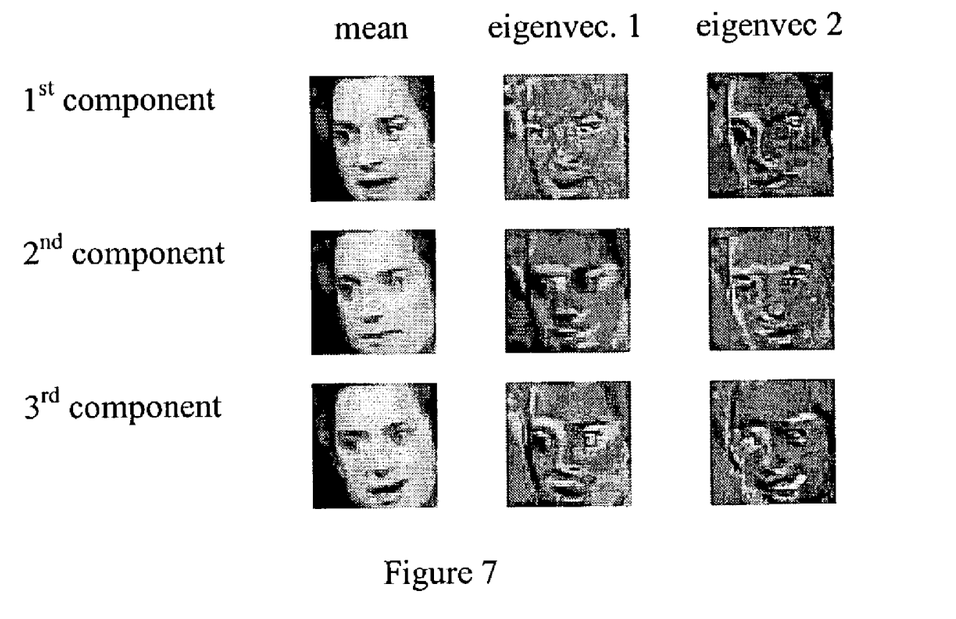
FIG. 7 shows the means and eigenvectors of UMPC at another time instance.

FIGS. 6 and 7 show the means and eigenvectors of UMPC at two different time instances. Referring to FIGS. 6 and 7, the UMPC model captures three main poses of the facial images. The eigenvectors associated with each mean facial image refine the facial image at each component likely to express different expressions, such as the mouth and eyebrows.

While FIG. 6 shows UMPC after training upon receiving 20 frames, FIG. 7 shows UMPC after training upon receiving 60 frames. UMPC model also captures a change in characters. The means and eigenvectors in FIG. 7 describe more about the second character.

Figure 8:
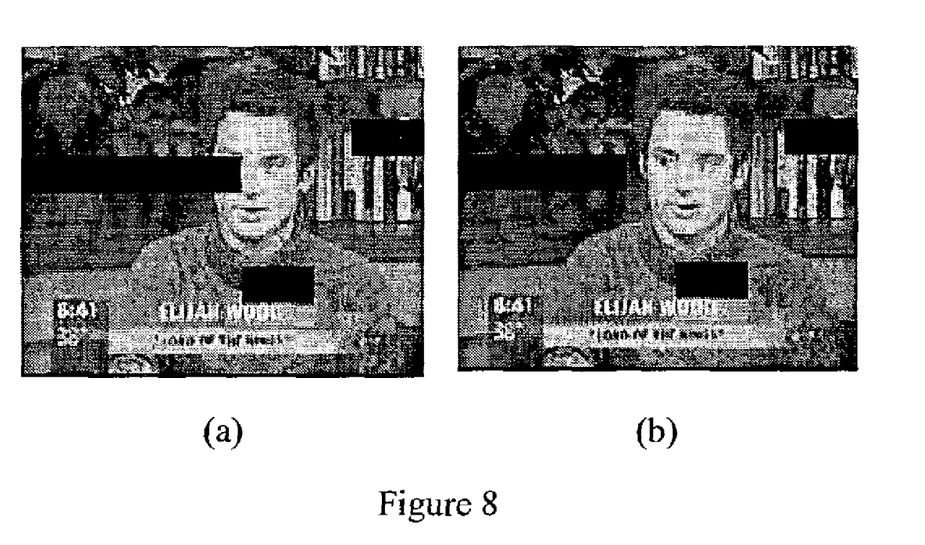
FIGS. 8(a) and 8(b) show decoded video frames without and with error concealment in the intra-coding scenario.
Figure 9:
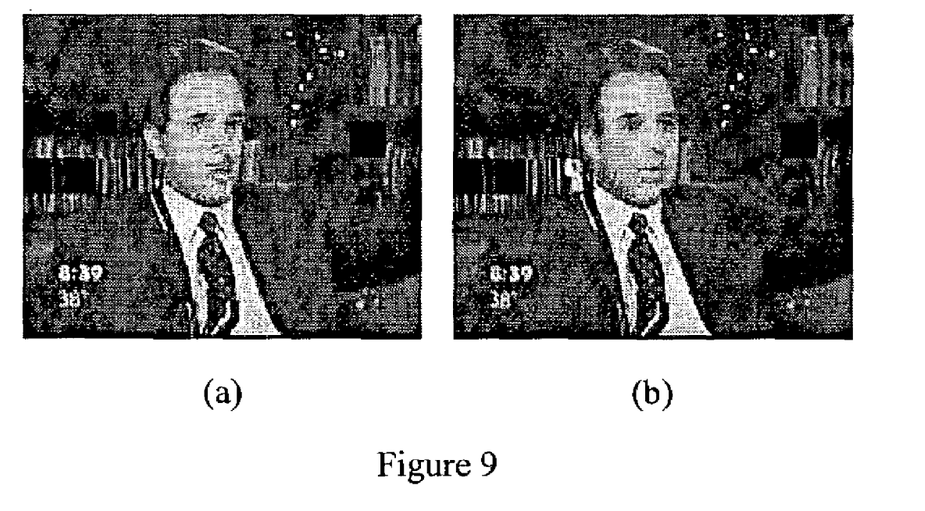
FIGS. 9(a) and 9(b) show decoded video frames without and with error concealment in the inter-coding scenario.

FIGS. 8 and 9 show the decoded video frames with and without error concealment. FIG. 8(a) shows a complete loss of MB content when the MB data is lost. FIG. 8(b) shows that the decoder successfully recovers the MB content with the corrupted ROI projected onto the UMPC model. FIG. 9(a) shows the MB content being recovered by motion compensation when the MB data is lost. The face is blocky because of the error in motion compensation. FIG. 9(b) shows that the decoder successfully recovers the MB content inside the ROI with the motion compensated ROI projected onto the UMPC model. The experiments described above were only performed to the ROI, which is the facial region.

The peak signal to noise ratio (PSNR) is also evaluated in the ROI. The overall PSNR performance of the decoded video frames is summarized in Table 1 below. In both the intra-coding and inter-coding scenarios, error concealment with UMPC performs the best.

TABLE 1

|  | None (Intra)/MC (Inter) | MPC | UMPC |
|---|---|---|---|
| Intra | 15.5519 | 29.3563 | 30.6657 |
| Inter | 21.4007 | 21.7276 | 22.3484 |

Figure 10:
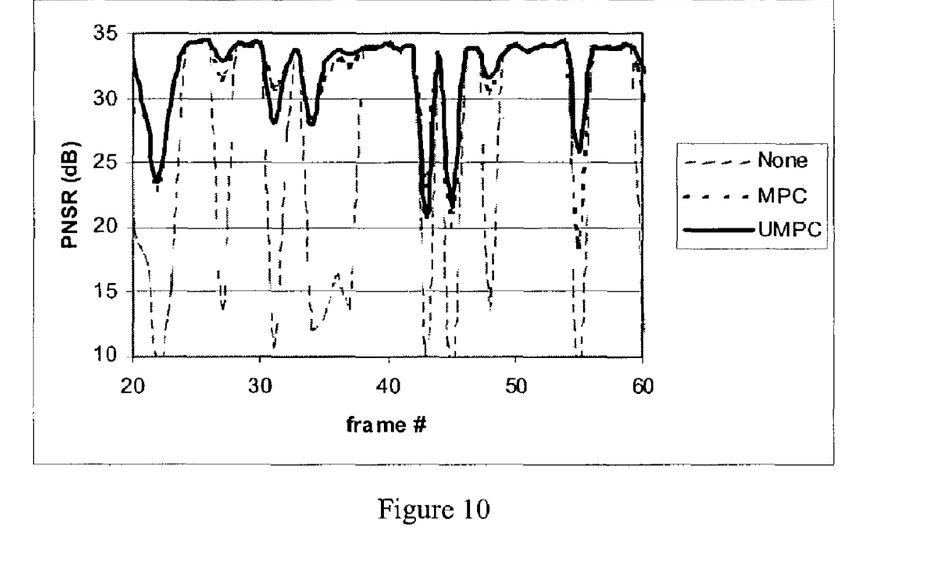
FIG. 10 is a chart showing frame-by-frame peak signal to noise ratio from an experiment with intra-coding scenario.
Figure 11:
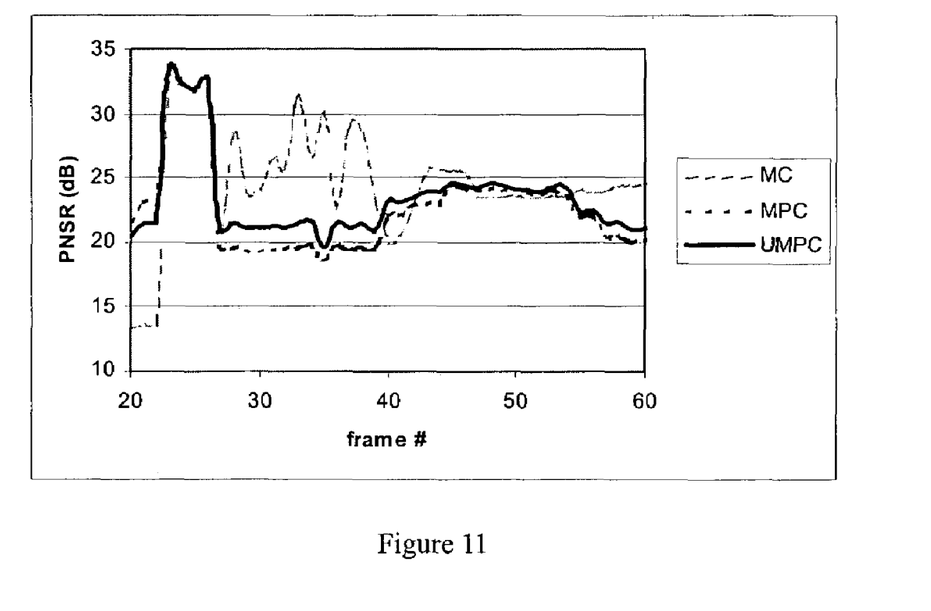
FIG. 11 is a chart showing frame-by-frame peak signal to noise ratio from an experiment with inter-coding scenario.

The frame-by-frame PSNR performances from frames 20 to 60 are shown in FIGS. 10 and 11, with intra-coding and inter-coding scenarios, respectively. As shown in FIG. 10, the performance curve of UMPC sits on top of all the others. Error concealment with UMPC, on average, performs the best in the inter-coding scenario as shown in FIG. 11.

It will be apparent to those skilled in the art that various modifications and variations can be made in the disclosed process without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of error concealment, comprising:
providing a first set of image data at a first time instant;
providing a second set of image data at a second time instant;
representing the first set of image data by a model of updating a mixture of principal components (UMPC) to form a UMPC model having a plurality of components;
receiving the second set of image data, wherein the second set of image data contains error-free data; and
updating the UMPC model using the error-free data at the second time instant,
wherein minimizing the error of representation of the error-free data at the second time instant by the UMPC model is achieved through iteration of the following:

$$\min_{\substack{m_j^{(n)}, U_j^{(n)}, w_i \\ \forall i,j}} \left( \frac{1}{\sum_{i=0}^{\infty} \alpha^i} \right)$$

$$\sum_{i=0}^{\infty} \alpha^i \left\| x_{n-i} - \sum_{j=1}^{M} w_{n-i,j} \underbrace{\left[ m_j^{(n)} + \sum_{k=1}^{P} \left[ (x_{n-i} - m_j^{(n)})^T u_{jk}^{(n)} \right] u_{jk}^{(n)} \right]}_{\hat{x}_{n-i,j}} \right\|^2$$

wherein
n and i are time;

M is a number of components in the UMPC;
$x_i$ is a data vector at time i;
$m_j^n$ is a mean of the $j^{th}$ mixture component estimated at time n;
$u_{jk}^{(n)}$ is a $k^{th}$ eigen-vector of the $j^{th}$ mixture component estimated at time n;
$U_j^{(n)}$ is a matrix with P columns of $u_{jk}^{(n)}$, wherein k=1~P;
$\hat{x}_{ij}$ is a reconstruction of $x_i$ with mixture component j;
$\hat{x}_i$ is a matrix with M columns of $\hat{x}_{ij}$, j=1~M;
$w_{ij}$ is a weight of $\hat{x}_{ij}$ to reconstruct $x_i$;
$w_i$ is a vector with M entries of $w_{ij}$;
$\alpha$ is a decay factor, wherein $0<\alpha<1$; and
q, r are indices of the mixture component.

2. The method of claim 1 wherein an initial value of a mean $m_q^{(n)}$ of mixture of component q at time n is determined by:

$$m_q^{(n)} = \left(1 - \frac{w_{nq}^2}{\sum_{i=0}^{\infty} \alpha^i w_{n-i,q}^2}\right) m_q^{(n-1)} + \left(\frac{w_{nq}}{\sum_{i=0}^{\infty} \alpha^i w_{n-i,q}^2}\right)\left(x_n - \sum_{j=1, j\neq q}^{M} w_{nj}\hat{x}_{nj}\right).$$

3. The method of claim 1 wherein an initial value of a covariance matrix $C_r^{(n)}$ of mixture component r at time n is determined by:

$$C_r^{(n)} = \alpha C_r^{(n-1)} +$$

$$(1-\alpha) \left\{ \begin{array}{l} \left[ (x_n - w_{nr}m_r^{(n)}) - \sum_{j=1,j\neq r}^{M} w_{nj}\hat{x}_{nj} \right] [w_{nr}(x_n - m_r^{(n)})]^T + \\ [w_{nr}(x_n - m_r^{(n)})] \left[ (x_n - w_{nr}m_r^{(n)}) - \sum_{j=1,j\neq r}^{M} w_{nj}\hat{x}_{nj} \right]^T - \\ w_{nr}^2(x_n - m_r^{(n)})(x_n - m_r^{(n)})^T \end{array} \right\}.$$

4. The method of claim 1 wherein initial values of the weights are determined by:

$$\begin{bmatrix} w_{n-i} \\ \lambda \end{bmatrix} = \begin{bmatrix} 2\hat{X}_{n-i}^T \hat{X}_{n-i} & 1 \\ 1^T & 0 \end{bmatrix}^{-1} \begin{bmatrix} 2\hat{X}_{n-i}^T x_{n-i} \\ 1 \end{bmatrix}$$

wherein $1=[1 \ldots 1]^t$ is an M×1 vector.

5. A method of error concealment, comprising:
representing a set of image data by a model of updating mixture of principal components (UMPC), each principal component of the UMPC model having a mean, a set of eigenvectors, and a weight at any given time instant, wherein the UMPC model is used for concealing video errors;
providing the set of image data at a first time instant and at any time instant before the first time instant;
receiving the set of image data at a second time instant, wherein the set of image data at the second time instant contains at least one error-free region of interest (ROI);
updating the UMPC model to minimize a representation error of the at least one error-free ROI at the second time instant by the UMPC model;
receiving the set of image data at a third time instant, wherein the set of image data at the third time instant contains at least one corrupted ROI; and reconstructing the at least one corrupted ROI at the third time instant using the updated UMPC model at the second time instant, comprising:
    reconstructing the at least one corrupted ROI using each component of the updated UMPC model; and
    combining the reconstructed ROI from each component for the at least one corrupted ROI;
wherein a combination coefficient of the reconstructed ROI from each component is inversely proportional to a reconstruction error of the representation of the corrupted ROI with the each component.

6. The method of claim 5, wherein the model of the UMPC is updated with the at least one error-free ROI when the representation error of the at least one error-free ROI by the UMPC model exceeds a threshold.

7. The method of claim 5, wherein the set of image data at the second time instant contains a plurality of error-free ROIs, and all of the plurality of error-free ROIs are used to update the UMPC model.

8. The method of claim 5, wherein the second time instant is the same as the third time instant.

9. The method of claim 5, wherein the UMPC is updated in non-contiguous time instants.

10. The method of claim 5, wherein updating the UMPC model comprises
    initializing the mean, the set of eigenvectors, and the weight of each component of the UMPC at the second time instant;
    for each component of the UMPC, solving for the mean, the set of eigenvectors, and the weight at the second time instant by iterating the following steps until said means, said set of eigenvectors, and said weight converge or a predefined condition such as the number of iterations is achieved:
    optimizing and updating the mean with the set of eigenvectors and the weights fixed,
    optimizing and updating the set of eigenvectors with the mean and the weight fixed, and
    optimizing and updating the weight with the mean and the set of eigenvectors fixed.

11. The method of claim 5, wherein the combination of the reconstructed ROI from each component is a linear combination.

12. The method of claim 5, further comprising
    replacing the corrupted ROI with reconstructed ROI, and
    repeating the step of reconstructing the at least one corrupted ROI and replacing the corrupted ROI with the reconstructed ROI until the reconstructed ROI is satisfactory.

* * * * *